May 31, 1949.　　　　A. RAPPL　　　　2,471,897
FLUID MOTOR PACKING
Filed Jan. 13, 1945
Fig. 1.
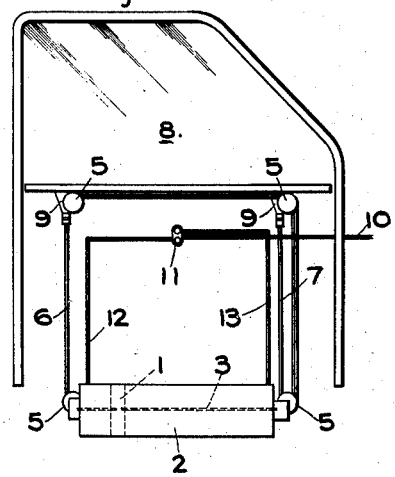
Fig. 2.
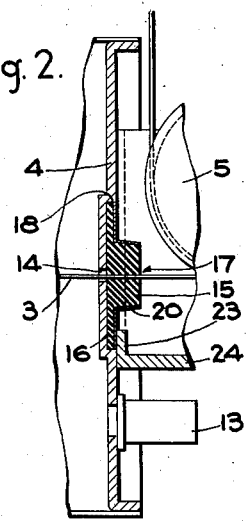
Fig. 5.
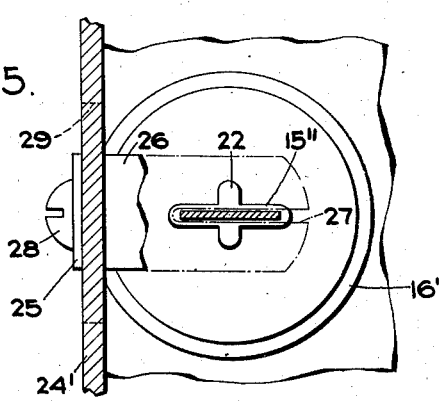
Fig. 3.
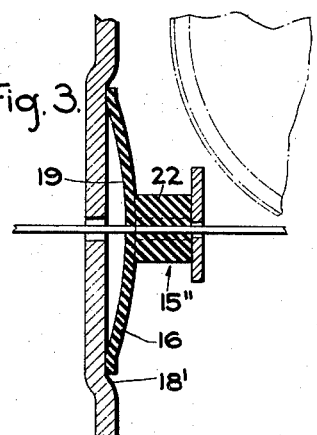
Fig. 6.
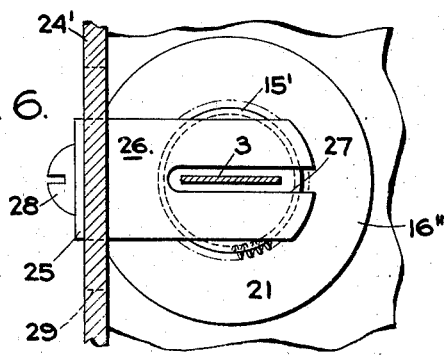
Fig. 4.
INVENTOR
ANTON RAPPL
BY
Bean, Brooks, Buckley & Bean. ATTORNEYS Patented May 31, 1949

2,471,897

UNITED STATES PATENT OFFICE 2,471,897

FLUID MOTOR PACKING

Anton Rappl, Eggertsville, N. Y., assignor to Trico Products Corporation, Buffalo, N. Y.

Application January 13, 1945, Serial No. 572,680

4 Claims. (Cl. 286—26)

This invention relates to the fluid motor art and particularly to the fluid sealing of the same against leakage about the piston rod, or the like, the same being a continuation-in-part of my copending application Serial No. 454,634, now Patent No. 2,432,799, issued December 16, 1947.

Ordinarily, the piston rod which constitutes a power transmitting member is circular in cross section and is packed in various manners in an effort to effectively seal the motor chamber against air leakage thereat without imposing too great a friction load upon the motor.

The primary object of the present invention is to provide a practical and efficient gasket and wall structure for fluid motor chambers by which fluid leakage through a sliding joint, such as where a piston rod extends through the chamber wall, is substantially prevented.

Furthermore, an equally important desideration of this invention resides in the improved construction by which the sealing action and effectiveness is responsive to and in accordance with the pressure differential then active.

More particularly the invention resides in those features of construction and the arrangements and combinations of parts hereinafter set forth, reference being had to the accompanying drawing, wherein:

Fig. 1 is a diagrammatic view illustrating a fluid motor employed, by way of example, for the adjustment of a window of a motor car;

Fig. 2 is a fragmentary sectional view of such motor enlarged to show the improved gasket arrangement of the present invention;

Figs. 3 and 4 are similar sectional views of modified embodiments; and

Figs. 5 and 6 are corresponding elevational views of the gaskets shown in Figs. 3 and 4, respectively, a portion of the retainer being broken away in Fig. 5.

Referring more particularly to the drawing, the fluid motor is depicted as having a piston 1 slidable in a chamber 2 and having its power transmitting member or rod 3 extending through the end wall 4. Without the chamber this member is flexible and supported by four pulleys 5, the latter disposing two active flight portions 6 and 7 substantially parallel for supporting the automobile window panel 8 through brackets 9. The pressure supply line 10, which may lead to the intake manifold of the vehicle engine, is connected to the motor chambers through a control valve unit 11 and branch conduits 12 and 13 so that by suitably manipulating the valve 11 the piston will move to the right or to the left, as viewed in Fig. 1, and accordingly adjust the window. The valve unit normally establishes suction communication with both ends of the chamber concurrently so that the piston will be suction balanced. Opening one end or the other to the atmosphere and closing off the suction thereto will unbalance and operate the piston.

The piston rod or power transmitting member 3 may be an endless flexible unit and is shown in shape as a flat tape or band. The opening 14 in the end wall through which the band emerges may therefore be in the form of a slot. For sealing this slot there is provided a gasket having an elongated body 15 and an encircling base flange 16, the latter seating upon the outer surface of the end wall 4 about the slot. The gasket is formed with a slit 17 extending throughout the length of the body and snugly receiving the band 3 in a slidable and substantially fluidtight fit. Preferably, the gasket material is rubbery and possesses a degree of elasticity, the base flange being readily yieldable to a fluid pressure differential for an effective sealing engagement with the end wall. An upstanding ridge 18 (18') surrounds the base flange and serves to center the gasket with respect to the slot 14.

The bottom face of the gasket, or that face which seats upon the end wall, may be slightly dished as depicted at 19 in Figs. 3 and 4 and consequently with suction in the near end of the motor chamber the resultant pressure differential of the exterior atmosphere will urge the base flange 16' (16") tightly upon the end wall 4 to augment the sealing capacity of the gasket. The dished base portion of the gasket will be drawn down more firmly upon the chamber wall which action will tend to cant the adjacent portions of the body 15 against the flat upper and lower faces of the band, and in this connection it will be observed that the major perimetric portion of the flat band is contained within these two faces and since they are flat the problem of effectively sealing the joint is greatly facilitated. The fact is appreciated more when the thinness of the band is considered.

The body portion 15 is designed to hug tightly the band and for this purpose a conical sheath 20 may envelope the body portion, or a coil spring 21 may embrace the body portion 15' under tension, as shown in Fig. 4. If desired, the body portion 15" may be made more responsive to the fluid pressure differential by reducing its wall thickness, as illustrated in Figs. 3 and 5, provision being made to reinforce the body against longitudinal collapse, as by means of the ribs 22.

Since suction normally maintains in both ends of the chamber the gaskets may be simply placed over the slots 14 in the opposite end walls 4. To prevent accidental dislodgment of each gasket a retainer is provided. In Fig. 2 the retainer may be a plate flange 23 on the pulley mounting bracket 24, or it may be an angle member 25 having an angularly extending plate flange 26 formed with a slot 27 to receive the band, as shown in Figs. 5 and 6. The angle member may be secured in place on the pulley mounting bracket 24' by a screw 28 with the flange or stop part 26 extending through an opening 29 in the bracket. The stop parts of the retainers merely overhang the gaskets to confine them against outward displacement from the end walls.

The gasket has a long and large surface contact with the band as it slides back and forth, and with the relatively large base flange acts to practically seal the wall opening against air leakage, and, while the foregoing description is detailed for clarity, it is not intended thereby to limit the scope of the invention beyond the terms of the appended claims since the inventive principles involved may be utilized in other physical embodiments without departing from the spirit of the invention.

What is claimed is:

1. A fluid motor having a chamber, an end wall of which is formed with an opening, a power transmitting member slidably extending through the wall opening, and a sealing gasket having an elongated body lying in sealing contact with the member and a relatively pliable pressure responsive base flange spreading out over the end wall with its wall opposing underface being dished and its peripheral edge normally seating upon the end wall, such base flange yielding into greater surface contact with the end wall when its underface is acted upon by the pressure differential between the inside and outside pressures.

2. A fluid motor having a chamber with an end wall formed with an opening, a power transmitting member slidably extending through the wall opening, and a sealing gasket having an elongated body lying throughout its length in sealing contact with the member and a relatively pliable base flange spreading out over the end wall in sealing contact therewith, and being normally dished therefrom whereby the pressure differential between the outside atmospheric pressure and the chamber pressure will cause the gasket to flatten against the end wall more or less in accordance with the pressure differential acting thereon.

3. A fluid motor having a chamber with an end wall formed with an opening, a power transmitting member slidably extending through the wall opening, a sealing gasket having an elongated body with an opening therethrough for snugly receiving the member and a relatively pliable base flange at one end spreading out over the end wall, but dished away therefrom, whereby the pressure differential between the outside atmospheric pressure and the chamber pressure will cause the gasket to flatten against the end wall more or less in accordance with the pressure differential acting thereon, and retainer means freely overhanging the gasket to limit displacement of the latter when not being urged toward the end wall by the pressure.

4. A fluid motor having a chamber with an end wall formed with an opening, a power transmitting member slidably extending through the wall opening, and a sealing gasket having an elongated body with an opening therethrough for snugly receiving the member and a relatively pliable base flange at one end spreading out over the end wall but dished away therefrom whereby the pressure differential between the outside atmospheric pressure and the chamber pressure will cause the gasket to flatten against the end wall more or less in accordance with the pressure differential acting thereon.

ANTON RAPPL.

REFERENCES CITED

The following references are of record in the file of this patent:

UNITED STATES PATENTS

| Number | Name | Date |
| --- | --- | --- |
| 1,106,930 | Desmond | Aug. 11, 1914 |
| 1,344,028 | Ewald | June 22, 1920 |
| 1,714,786 | Hughes | May 28, 1929 |
| 1,823,801 | Hiatt | Sept. 15, 1931 |
| 1,834,701 | Gustafson | Dec. 1, 1931 |
| 2,055,904 | Lindgren | Sept. 29, 1936 |
| 2,094,124 | Huffman | Sept. 28, 1937 |
| 2,145,884 | Leman | Feb. 7, 1939 |
| 2,145,928 | Heinze et al. | Feb. 7, 1939 |
| 2,272,650 | Von Veh | Feb. 10, 1942 |
| 2,390,928 | Del Mar et al. | Dec. 11, 1945 |

FOREIGN PATENTS

| Number | Country | Date |
| --- | --- | --- |
| 218,579 | Great Britain | July 10, 1924 |

Certificate of Correction

Patent No. 2,471,897.　　　　　　　　　　　　　　　　　　　　May 31, 1949.

ANTON RAPPL

It is hereby certified that error appears in the printed specification of the above numbered patent requiring correction as follows:

Column 4, line 18, claim 3, after the word "pressure" and before the period insert *but permitting such pressure responsive movement of the flange toward the end wall;* and that the said Letters Patent should be read with this correction therein that the same may conform to the record of the case in the Patent Office.

Signed and sealed this 8th day of November, A. D. 1949.

[SEAL]

THOMAS F. MURPHY,
　　　　　　　　　　　　　　　　　　　　　　　*Assistant Commissioner of Patents.*